US010824313B2

(12) United States Patent
Park et al.

(10) Patent No.: US 10,824,313 B2
(45) Date of Patent: Nov. 3, 2020

(54) METHOD AND DEVICE FOR CREATING AND EDITING OBJECT-INSERTED IMAGES

(71) Applicant: PJ Factory Co., Ltd., Seoul (KR)

(72) Inventors: Jung Hwan Park, Seoul (KR); Hee Kyung Kang, Seoul (KR); Suguri Masahiko, Kyoto (JP); Woo-Jin Jun, Seongnam-si (KR)

(73) Assignee: P.J. FACTORY CO., LTD., Seoul (KR)

( * ) Notice: Subject to any disclaimer, the term of this patent is extended or adjusted under 35 U.S.C. 154(b) by 48 days.

(21) Appl. No.: 15/858,745

(22) Filed: Dec. 29, 2017

(65) Prior Publication Data

US 2018/0188926 A1    Jul. 5, 2018

Related U.S. Application Data

(63) Continuation-in-part of application No. 14/781,911, filed as application No. PCT/KR2014/002913 on Apr. 4, 2014, now Pat. No. 10,061,493.

(30) Foreign Application Priority Data

Apr. 4, 2013  (KR) .................. 10-2013-0036683

(51) Int. Cl.
*G06F 3/0484*   (2013.01)
*G06F 3/0482*   (2013.01)
(Continued)

(52) U.S. Cl.
CPC ........ *G06F 3/04845* (2013.01); *G06F 3/0482* (2013.01); *G06F 3/0486* (2013.01);
(Continued)

(58) Field of Classification Search
CPC .............................. G06F 3/04845; G06F 16/54
See application file for complete search history.

(56) References Cited

U.S. PATENT DOCUMENTS 6,070,167 A  *  5/2000  Qian .............. H04N 21/234318
6,489,970 B1 *  12/2002 Pazel ................... G06F 3/0486
                                                        715/763
(Continued)

FOREIGN PATENT DOCUMENTS

KR        10-0900295 B1    5/2009
KR    10-2010-0088248 A    8/2010
(Continued)

OTHER PUBLICATIONS

International Search Report for PCT/KR2015/010842 dated Dec. 21, 2015 from Korean Intellectual Property Office.

*Primary Examiner* — Scott T Baderman
*Assistant Examiner* — Steve P Golden
(74) *Attorney, Agent, or Firm* — Sughrue Mion, PLLC

(57) ABSTRACT

The present disclosure in some embodiments provides a method of generating an object-inserted image. A method in some embodiments is performed by an electronic device for inserting one or more objects into a main image to generate an object-inserted image, including determining a first position for inserting a second object into the main image in response to a user input, and identifying whether a first object is absent or present as a preinserted object at the first position in the main image, and inserting the second object at the first position in the main image when the first object is absent, and inserting the second object at a second position in the first object based on a user selection when the first object is present.

9 Claims, 12 Drawing Sheets

(51) Int. Cl.
*G06F 3/0486* (2013.01)
*G06F 3/0488* (2013.01)
*G06F 3/0481* (2013.01)
*G06F 16/54* (2019.01)

(52) U.S. Cl.
CPC ........ *G06F 3/0488* (2013.01); *G06F 3/04817* (2013.01); *G06F 3/04883* (2013.01); *G06F 16/54* (2019.01); *G06F 2203/04806* (2013.01)

(56) References Cited

U.S. PATENT DOCUMENTS

| | | | | |
|---|---|---|---|---|
| 7,975,020 | B1* | 7/2011 | Green | G06Q 30/0241 705/14.4 |
| 8,539,384 | B2 | 9/2013 | Hinckley et al. | |
| 2001/0032248 | A1* | 10/2001 | Krafchin | G06Q 10/107 709/206 |
| 2003/0138126 | A1* | 7/2003 | Hashimoto | G06T 1/0021 382/100 |
| 2006/0001758 | A1 | 1/2006 | Nam et al. | |
| 2009/0087123 | A1* | 4/2009 | Izawa | G06K 9/00228 382/284 |
| 2009/0307631 | A1 | 12/2009 | Kim et al. | |
| 2010/0090971 | A1* | 4/2010 | Choi | G06F 3/04883 345/173 |
| 2011/0072373 | A1 | 3/2011 | Yuki | |
| 2011/0268369 | A1* | 11/2011 | Richards | G06T 5/005 382/284 |
| 2012/0072410 | A1* | 3/2012 | Wang | G06F 16/5866 707/711 |
| 2012/0144293 | A1 | 6/2012 | Kim | |
| 2012/0185768 | A1 | 7/2012 | Dowd | |
| 2013/0050109 | A1 | 2/2013 | Ban | |
| 2014/0071323 | A1 | 3/2014 | Yi et al. | |

FOREIGN PATENT DOCUMENTS

| | | |
|---|---|---|
| KR | 10-2012-0062297 A | 6/2012 |
| KR | 10-2012-0107836 A | 10/2012 |
| WO | 01/16694 A1 | 3/2001 |

* cited by examiner

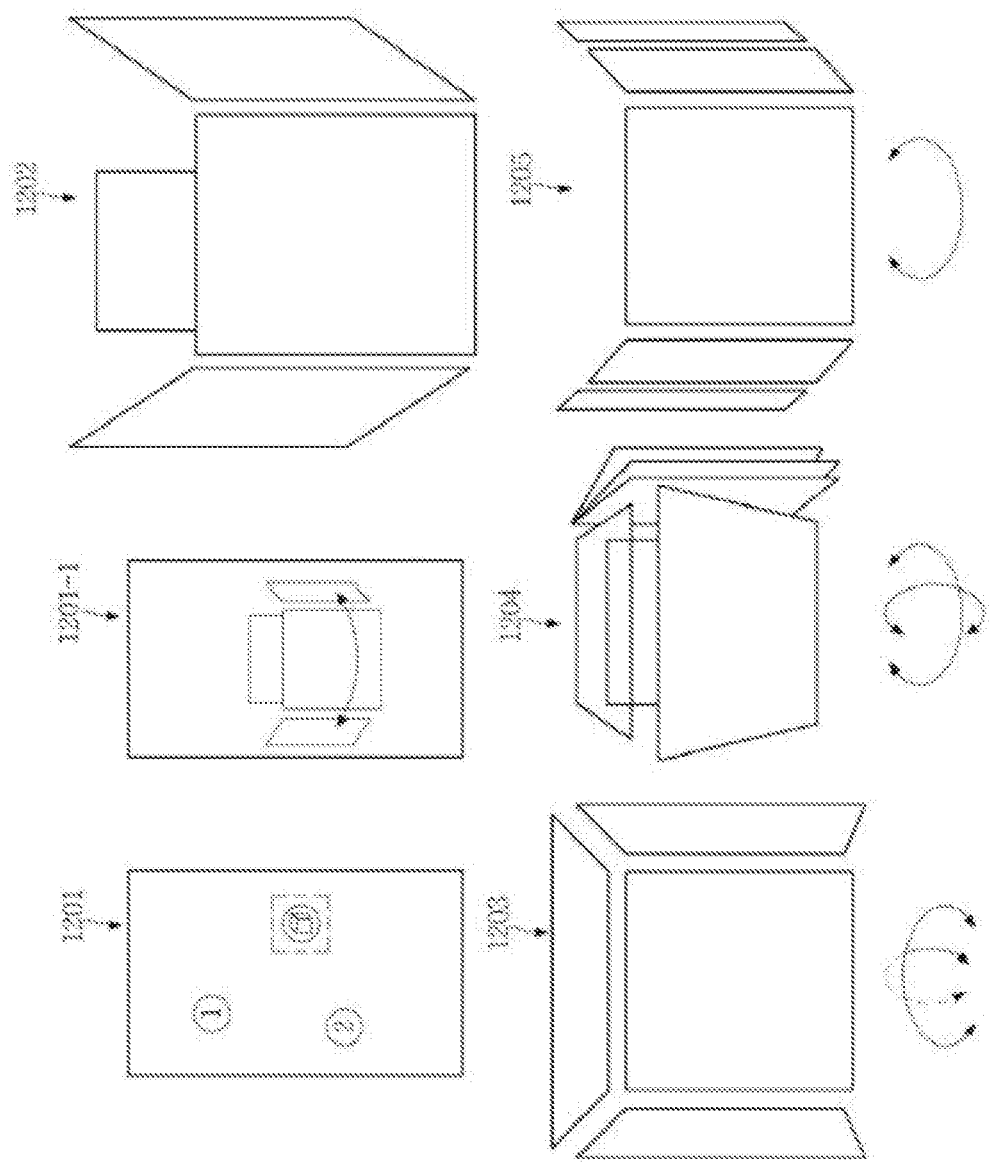

METHOD AND DEVICE FOR CREATING AND EDITING OBJECT-INSERTED IMAGES

CROSS-REFERENCE TO RELATED APPLICATIONS

This application is a continuation-in-part of U.S. patent application Ser. No. 14/781,911 filed on Dec. 10, 2015, which is a national stage entry of PCT/KR2014/002913 filed on Apr. 4, 2014, which claims the benefit of Korean patent application No. 10-2013-0036683 filed Apr. 4, 2013, the entire disclosures each of which are incorporated herein by reference.

TECHNICAL FIELD

This invention is associated with creating and editing images in mobile devices such as smartphones. Particularly, this specification describes the effective mechanism, installation and method to generate and edit the image created by inserting other image and video contents into a certain image.

BACKGROUND

When opening an image file using a personal computer or mobile device, a more detailed information or a more magnified image of a particular part of the image file may be required. For example, in the case of a figure photo, information about the name of person in the image may be required. In such case like this, the automatic or manual tagging of the name whose face in the image is recognized into the responding position by device or system is utilized. As for any photo of automobile or smartphone or other mechanical structure, a more detailed image may be required in a profile showing thickness of automobile headlight, smartphone or connecting jack components, in which case the method of magnification is used or separate identification of the additional materials that contain a detailed information on such part is required (e.g. search over hard disk and initialization of the responding additional material).

However, these like methods, namely the tagging of associated contents to a particular part of image or the magnification of a certain part of image, have limited information to be entered or resolution to be provided. And it is very cumbersome to separately look up for an additional material.

DETAILED DESCRIPTION OF INVENTION

Technological Task

This invention places its purpose in providing the method of generating an object-inserted image which provides detailed information about an image by inserting into an image or video contents.

Also, another purpose of this invention is to provide a method of stacking the object to be inserted at certain area, where there are multiple objects to be inserted by which generate an object-inserted images with multiple objects or contents inserted.

Moreover, this invention has the purpose of providing a gesture that minimizes the touch input used when generating and/or editing the object inserted image.

Technological Solution

In accordance with some embodiments of the present disclosure, a method performed by an electronic device for inserting one or more objects into a main image to generate an object-inserted image, includes determining a first position for inserting a second object into the main image in response to a user input, and identifying whether a first object is absent or present as a preinserted object at the first position in the main image, and inserting the second object at the first position in the main image when the first object is absent, and inserting the second object at a second position in the first object based on a user selection when the first object is present.

In accordance with another embodiment of the present disclosure, a method performed by an electronic device for inserting one or more objects into a main image at multiple depths to generate an object-inserted image, includes displaying the main image, receiving a user input for selecting a first position in the main image with a first object being present at the first position as a preinserted object, displaying the first object present at the first position in the main image, receiving a user input for selecting a second position for inserting a second object in the main image on the first object, and generating a multi-depth image with the first object and the second object hierarchically inserted in the main image at multiple depths by inserting the second object into the main image at a second position on the first object.

Moreover, a mobile computing device can be used to solve the aforementioned technological tasks. The mobile computing device may include control module, communication module, display module, filming module, storage, and screen. Additionally, it may include input/output part and these components in the device can be deleted/added for the effective use of technique. As for one example of practice execution of mobile device for generating or editing object-inserted image: control module that decides main image and generates or edits the object inserted image; display module that displays main image and object; and the storage for saving the above main image, object or object-inserted image. The above control module enables the display module to display menu about the above object based on the first user input that is received from the above user, to display the icon about the above object on the main image's certain location in overplay based on the user 2's input about the above menu, and to generate object-inserted image with the above object inserted in the chosen place of main image based on the user 3's input that moves the above icon to the main image's chosen place.

This invention can be consisted of program codes composed of the programs which perform the above sequential method. These program codes can be used in mobile computing device in the form of application or utilized for personal computer, laptop, desktop or digital cameras which include computing device.

Moreover, this invention can be realized through a recording media that can be read by computer which includes such program codes of performing the above-mentioned sequential method. The forms of recording media may exist in many forms such as optical disk, flash memory, SSD, HDD, RAM, ROM. Recording media like these can perform the methods for solving the task when used alongside with computing device that is applicable for the recording media.

This invention can also be performed in a cloud computing system to solve the aforementioned task. In a server it can perform the arithmetic necessary for data saving and object-inserted image generating/editing process; in client's device it receives the user input (for example touch-base input) from the user and sends them to server and can also display in the device's screen the received processing result of the arithmetic from the server.

A detailed method and means to solve the aforementioned task is described in the specification below and the request clause, which should be considered in an explanative perspective not in a limited perspective.

Favorable Effect

According to the invention, it would be possible to receive diverse and detailed information from single image by generating the image of one or more images inserted.

Moreover, by using optimized gesture, it has the effect of generating and editing object-inserted image through a simple and minimized input.

BRIEF DESCRIPTION OF THE DRAWINGS

FIG. 12 represents dimensionizing function according to the other practice execution of this invention.

FORMS FOR EXECUTING THE INVENTION

The following describes in more detail about this invention referring to the figures.

Figure 1:
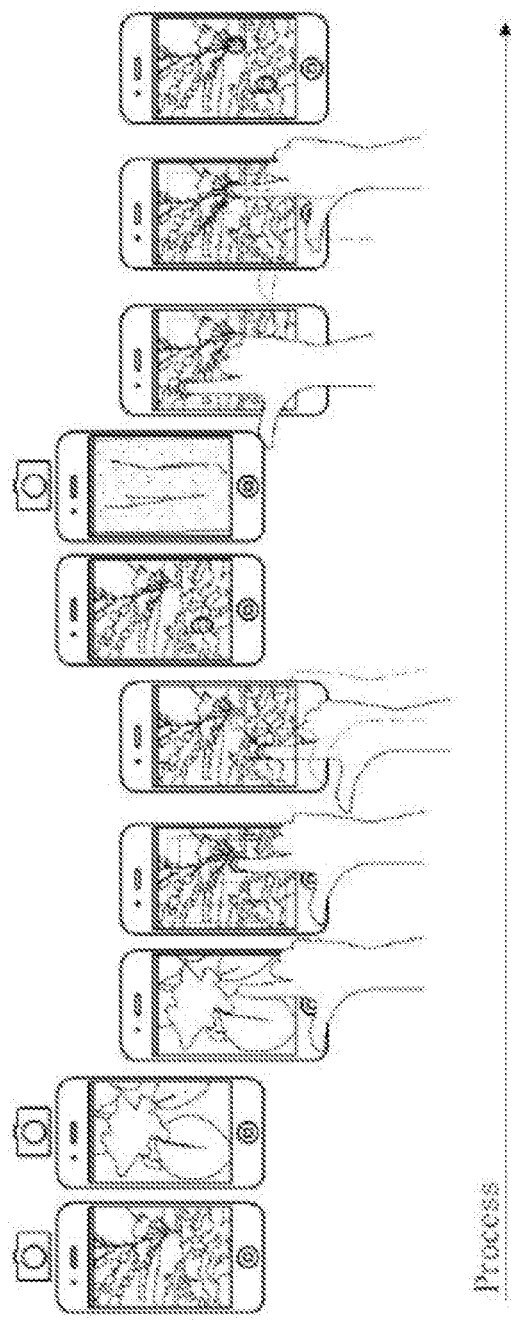
FIG. 1 roughly shows a method of generating object-inserted image.

FIG. 1 roughly shows the method of generating object-inserted image. In this specification, main picture or main image means the photograph into which objects are inserted. Also the contents inserted to the main image are referred to as detail or object. Object can be an image, video, text, voice record, links to other files, or URL (Uniform Resource Locator). Also object-inserted image means detailed picture into which the objects are inserted. That is, object-inserted image is consisted of main image and at least one object.

In reference to FIG. 1, a method of inserting detail 1 and detail 2 into the main picture is shown. All the inserted details are supposed to, for convenience be images all of which are taken by cameras of mobile devices.

First, the main image (several flowers and trees) is taken. The main image taken is saved in mobile device's storage and the user may successively take next pictures. After the main image is taken, camera's focus can be zoomed-in automatically or manually. Detail 1 (certain flower) is taken and will be displayed on the mobile device screen. Now, when the user touches a region of the displayed detail 1, main image will be displayed on the mobile device screen and a circle point, a minimized image of detail 1 or an icon that represents detail 1, etc. (hereinafter 'icon') is indicated at the location where the user touched. The user now drags this icon from the main image of several flowers and frees to the position of certain flower that corresponds with detail 1 and completes the touch input by taking off hands from the mobile device touch screen. In this step, user can select shooting button or enter pre-arranged gesture movement that switches to shooting mode to switch the mobile device to shooting mode. After taking detail 2 (Surface of tree), by the same method used for inserting detail 1, user drags detail 2 icon to the position of trees in the main image and completes the touch input. Finally, user can generate object inserted image with two details (detail 1, detail 2) inserted by clicking the save button. Object-inserted images generated in this way can be viewed in mobile device's image viewer applications and etc. and when selecting the inserted object region in object-inserted image it may be played (in case of the object being videos or audio files) or displayed on the device screen.

Figure 2:
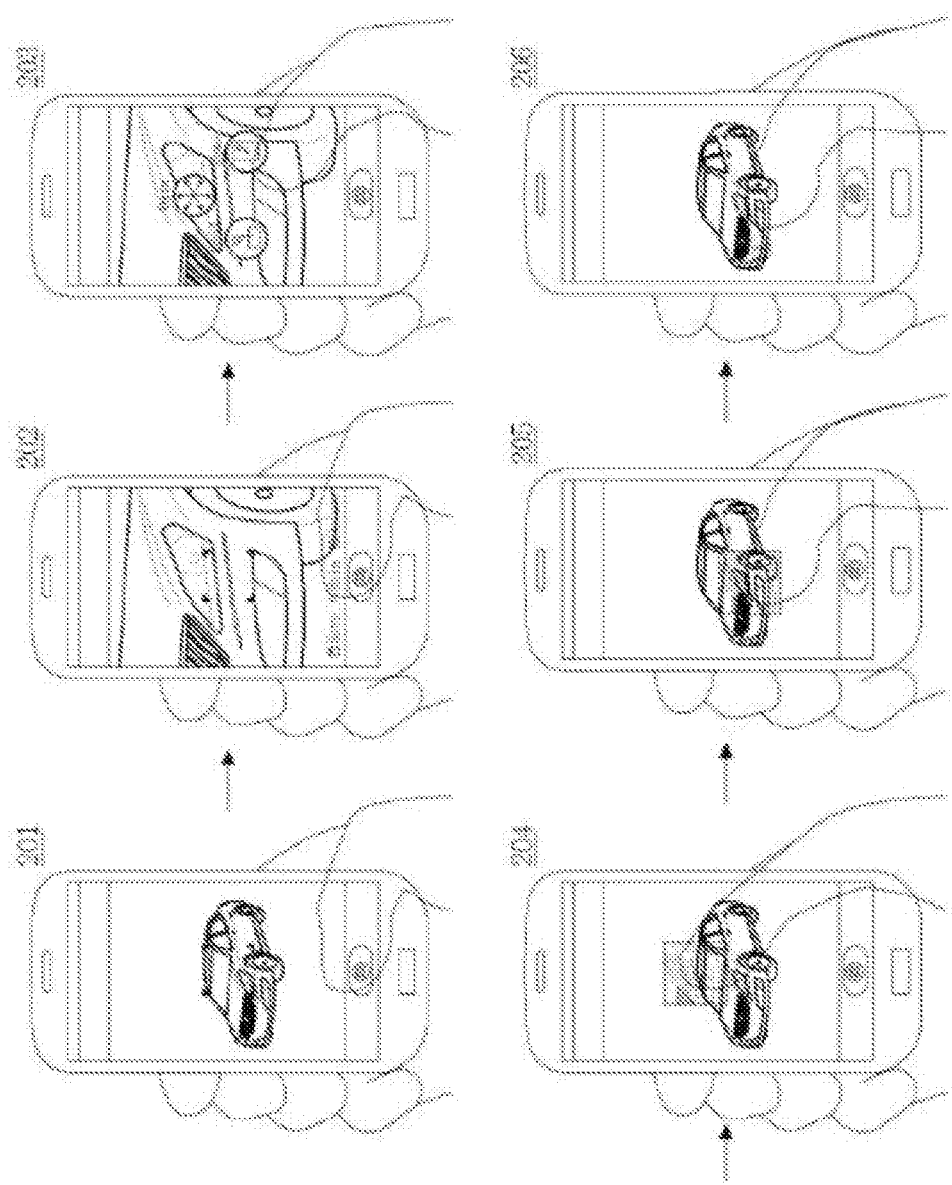
FIG. 2 represents a method of inserting an object into main image according to one practice execution.

FIG. 2 represents the method of inserting objects to the main image according to one practice execution of this invention. In reference to FIG. 2, user initializes shooting mode by using shooting module of mobile device. If the object taken is an automobile, user initially takes picture of an overall appearance. The taken image is saved as a main image. This saving process is done by user's input or can be done automatically on the application that realizes shooting mode (step 201).

After main image is decided, user can take detail shots of each automobile structure separately. The taken image can be used as object inserted to the main image. When taking detail shots, shooting mode can be automatically switched into zoom-in mode. For example, once the main image is taken and stored, mobile device's control section can make shooting module to automatically zoom-in in a pre-arranged rate. Alternatively, user can manually zoom in camera to take detail shots. It is also possible to combine the aforementioned methods, which means that shooting module automatically zoom in camera with the user manually adjusting the zoom-in rate. Now, user can take pictures of object's each structure magnified, or the detail image (such as headlight parts) (step 202).

The object image taken can be displayed on mobile device screen. When user keeps touching the image of displayed object for a while, an edit menu for the object image is displayed (step 203). This menu may include the operation of attaching object to main image (In this specification called as detailing), sending outside of mobile device through networks, and recording notes about the object, etc. Keeping the touch state and dragging the touch point to, for example, the location on the detail menu the minimized or modified as an icon form will be displayed on the changed touch point and the image displayed on the mobile device screen will be changed from an object image to the main image (step 204).

In case where the filmed object is a video, after shooting is done, a random image related with video such as preview image of video or first frame of video will be displayed on the mobile device screen. The process starting from the time when the user began touch input on any image is as same as the aforementioned normal image process, thus is exempt from explanation here. In the case of already taken and stored image or video, it may be possible to perform detailing in the above method after loading the image or thumbnail into screen from gallery.

After this, user drags the icon to a desired position (step 205). In this example where the detail image being the picture of magnified automobile's headlight, user can move the detail icon to the main image's headlight area. After the completion of moving and when touch input is completed (by taking hands off from touch based display), detail is inserted into the main image with an indication that detail is inserted at such point (step 206). User can finally generate object-inserted image by saving this object-inserted image.

The main feature of this method is to minimize the interruption between taking shots (the method of inserting multiple objects to main image is described later), when attaching details while taking a successive shots of the object since position determination process is done by one touch (the action of touching screen once in case of mobile devices). If the object is a picture or video, the process of choosing main image and loading the chosen image can be performed automatically, enabling this kind of one-touch operation.

Also, these kinds of object-inserted image can be sent to SNS (Social Network Services), blog, or web page through device's communication module and also can be used in applications such as presentation software, text writing software, or e-book writing software such as iBook Author of computing device. Thus, in applications like this which supports object-inserted images, when the object-inserted image is loaded and the part that indicates object is inserted (for example, semi-transparent circle point, marking such as number or thumbnail) is selected by touch Input, the original contents of the object can be displayed/played. Also, while playing/displaying the original contents, it is possible to return to the object-inserted image display through a pre-arranged input and when editing is approved by the original author, a third person can insert the object into an image uploaded on web or received from another user.

The aforementioned method demonstrates the way of determining position into which the object is to be inserted after deciding (or generating) the object to be inserted into the main image. But in case of the object being a text or audio file such as a voice record, it might not be appropriate to generate object-inserted image in this procedure. In reference to FIG. 3, below is the method of determining a position where the object is to be inserted and of deciding the content of the object to be inserted.

Figure 3:
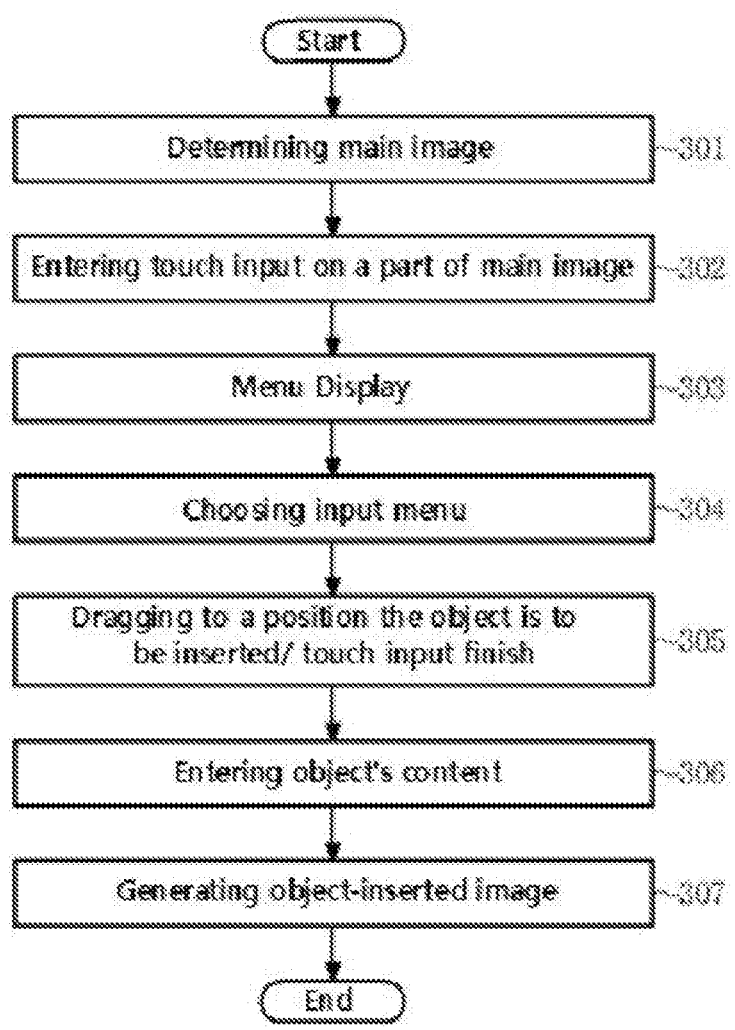
FIG. 3 represents a method of entering object's content after deciding the place the object is to the inserted.

FIG. 3 represents a method of determining a position where the object is to be inserted first and then deciding the content of the object to be inserted. First user decides the main image (step 301). Main image can be selected from saved images in mobile device's storage. Also pictures taken by filming module can also be chosen as main image. Main image can be automatically determined by mobile device's control module in accordance with a pre-arranged condition, which will be explained in more detail hereafter.

The user touches a part of main image (step 302). In this specification, whether the image displayed in mobile device's screen is main image or detail image, selecting a part of displayed image can call up a menu of main or detail image. Menu can also be loaded in another way; for example, it can be loaded by selecting the already defined button on the device or through input of gesture defined before.

After touch input is received, related main image menu will be displayed (step 303). For example, when "input, detail, link, send" is displayed, while holding down the touch input, user can move the touch point to a position where "input" is displayed. When user keeps touching the "input" menu for a certain time (step 304), detail generating menus such as "text, record" can be displayed. Now user can drag the touch point to a position where he/she wants to insert detail into the main image so that the desired menu (such as "text" menu) is approved and then complete the touch input (step 305). When touch input is competed, interface (such as virtual keyboard) is automatically provided (if in the aforementioned process, the menu user wanted was "record", interface for recording voice is provided), and when object generation is completed through detail contents input (step 306), text inserted object-inserted image is generated at the associated position (step 307).

Figure 4:
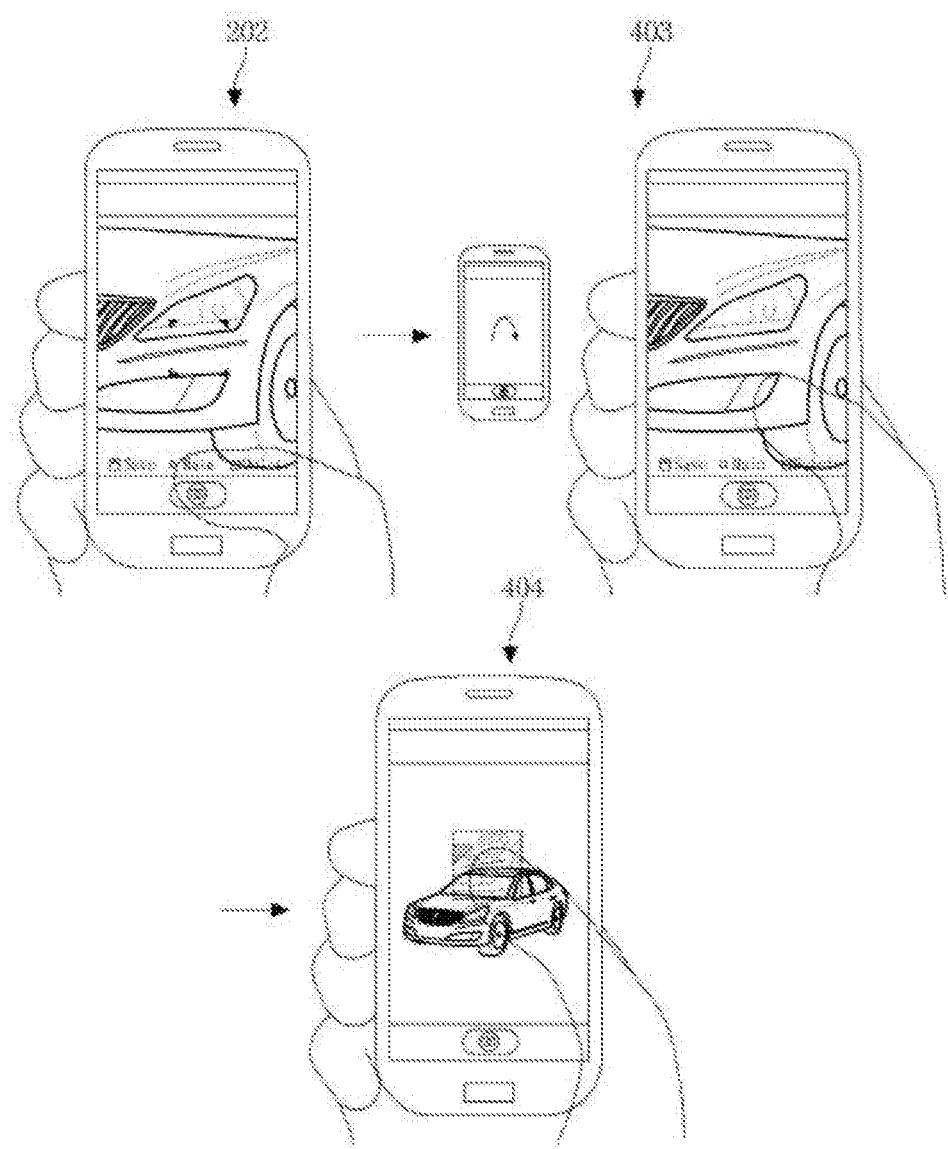
FIG. 4 represents method of generating object-inserted image according to the different examples of practice execution of this invention.

FIG. 4 represents a method of generating object-inserted image according to another practice execution of this invention. Through the method described in FIG. 4, user can generate object-inserted image bypassing menu displaying process.

Under the state where the object to be inserted in main image is determined (for example, the state up until FIG. 2 step 202), user can directly proceed to the step where the user places the object icon to the desired place in main image by continuously entering (dragging) a pre-defined gesture while touching object image instead of performing the operation of moving touch point to the associated menu after menu is displayed by touching the displayed object image (the operation of step 203). For example, at the point where object image shooting is completed (step 202) in the FIG. 4, user moves up and down the touch input by directly touching object image (step 403). Then main image is displayed in mobile device's screen while at the same time object image is transformed into icon and located at the final touch point (step 404). Now user can generate object-inserted image by moving the icon to a desired position and finishing touch input (step 205). Of course, forms of gesture can be defined in various ways. For example, bypass technique can be realized by inputs such as down and up or tripe touch. It is possible to assign each bypass definition to perform separate order such as text input, voice record, or sending etc.

Operations like this can be performed repeatedly. Thus, user can enter same gesture (up and down) after detail 1 is inserted to main image, taking picture of detail 2 and the picture of detail 2 is displayed according to the aforementioned procedures. After entering gestures, user places the generated icon at the desired position and finishes touch input. By performing procedures like this repeatedly, image with multiple objects inserted can be generated.

Figure 5:
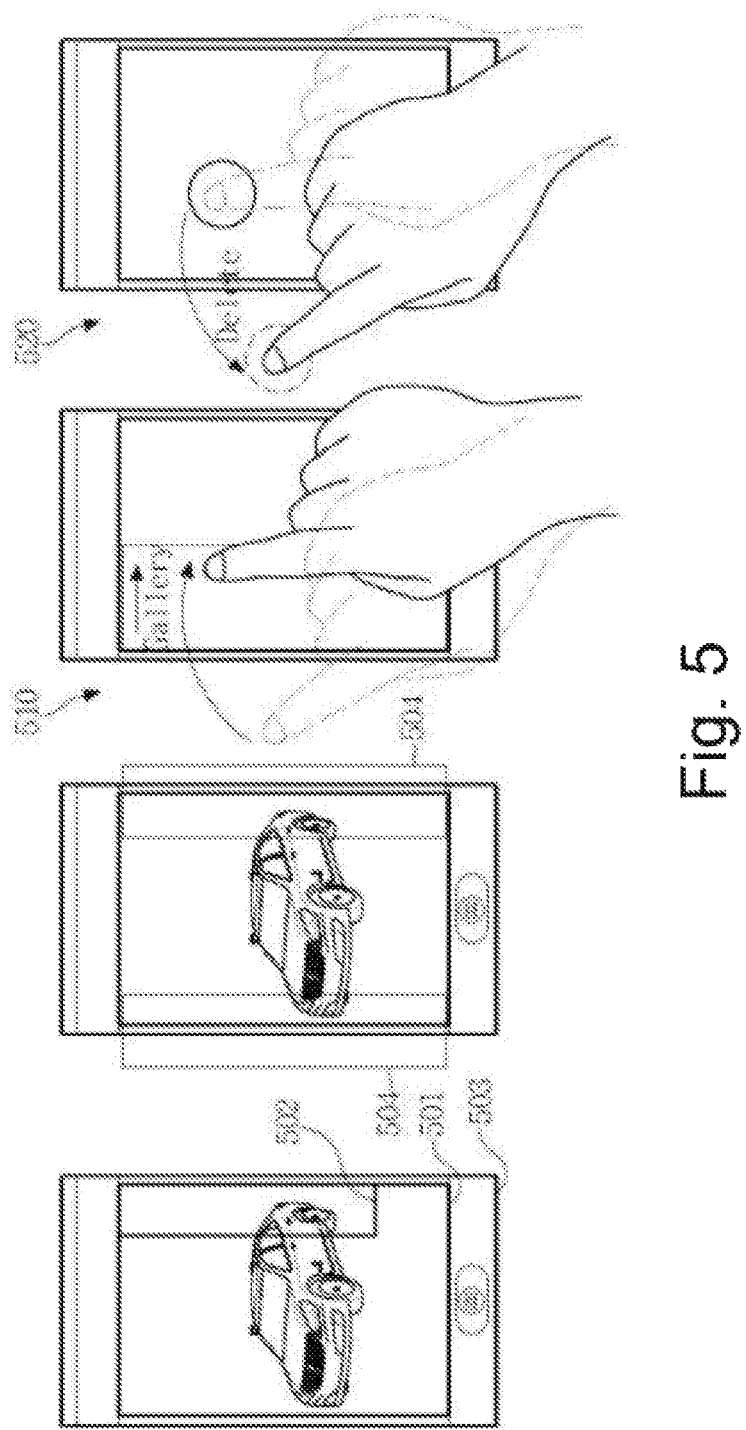
FIG. 5 represents examples of device screen area division and its respective usage sample.

Before explaining about the alternative method of generating image with multiple objects inserted, screen composition of mobile device will be explained. FIG. 5 represents the example of division of device screen area and its respective usage. In reference to FIG. 5, mobile device screen in this specification can roughly be divided into four areas. The first area to display image (501, display area), the second area to indicate the object icon temporarily (502, stacking area), the third area to direct the full area of mobile device screen (503, full screen area), and the fourth area that is used for importing gallery (510) or deleting (520) objects (details) (504, Gallery and trash area). A part or all of these areas can be overlapped with other areas. For example, in the represented example although the second area (502) is illustrated as comprising a certain left top area inside the first area (501), it can be located in right or upper/lower area and further can be located third area (503)'s certain region which is located outside of the first region (501). Also while main/objects that are being edited are displayed in the first area (501), when object is selected and contents are being displayed/played in the object-inserted image, it can be performed using a whole region of third area (503).

Although the fourth area (504) is illustrated as if including the outside area of the device screen, this is to help understanding since gestures or touch inputs that use the fourth area (504) usually move objects from outside to inside of the screen or vice versa.

Figure 6:
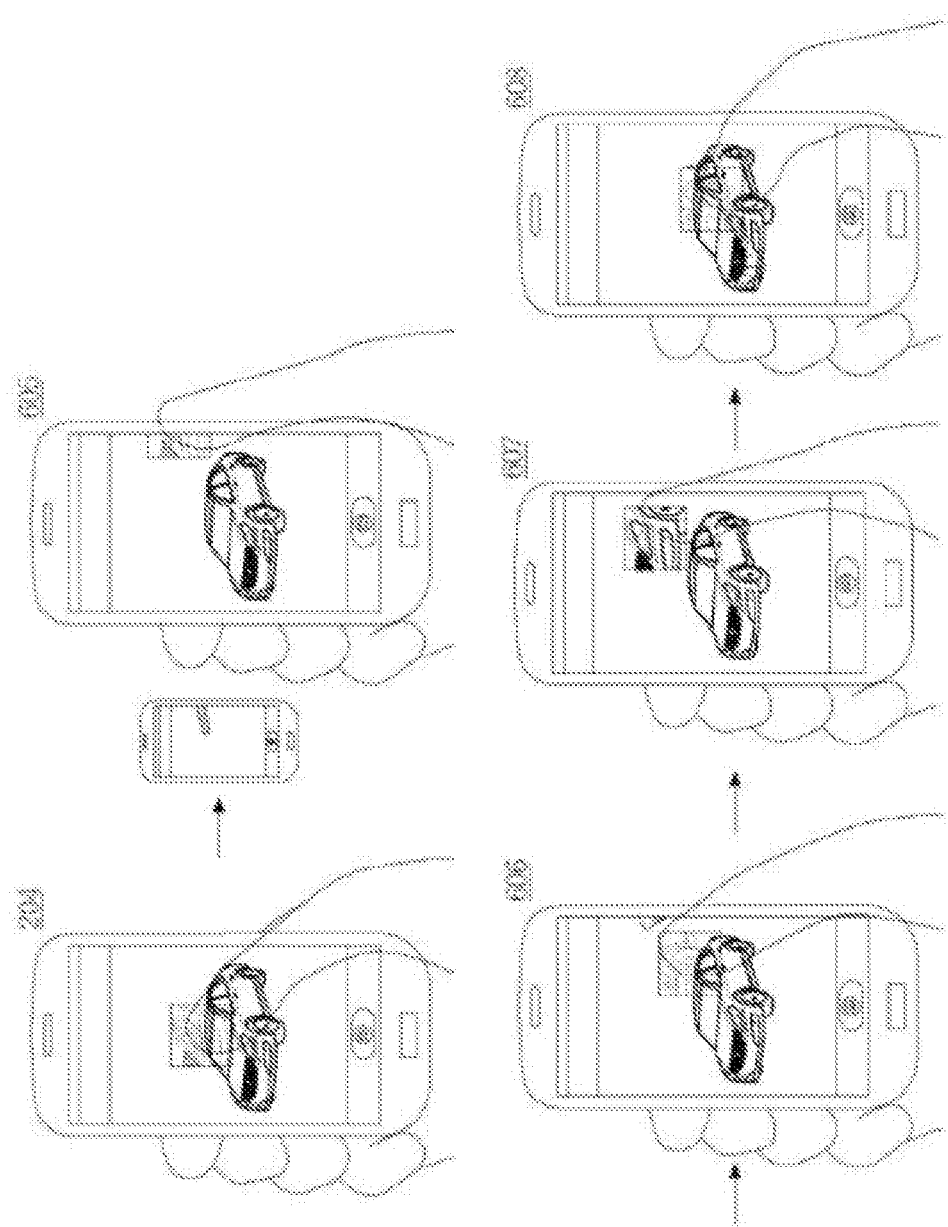
FIG. 6 represents a method of stacking objects at one side of screen.

Now in reference to FIG. 6, it is explained how to insert multiple objects in the main image. FIG. 6 represents the method of stacking objects at one side of screen. This stacking technique means to place a minimized form of object such as icons at one side (right or left) of the screen instead of inserting into the main image. Stacked object is always displayed on the top of screen (the top layer), separately from first area (501). Thus, while the screen displayed on the first area (501) is switched to camera, image gallery or other screens, the object stacked on the second area (502) will be displayed on the top of screen as long as the process of generating or editing object inserted image is not finished.

This function enables one to perform repeatedly the operation of stacking objects in the second area (502), further allowing the user to perform separately the operation of inserting object into the main image and the operation of shooting object image. Also, one can load a saved image (for example, image gallery) by entering a pre-defined gesture (for example, dragging from first area or fourth area's outside across the third area to the second area). Through this, it is possible to insert the saved images into main image while shooting object images separately. Moreover, it is also possible to operate in the way first stacking the filmed detail 1,2,3 in the second area (502), then inserting and saving the detail 1,2 by opening up image gallery and loading first main image, and again loading second main image, inserting detail 3 and then saving it. Detail stacking feature allows users to modify the procedure and methods of generating object-inserted image, and also the main image.

In regard of modifying main image, it is explained later in reference to FIG. 9. In step 204 explained in reference to FIG. 2, user moves icon to the second area (502) (step 605). Now once user takes off her/his hand from mobile device's screen (finishing touch input), icon is stacked in the second area (502). User can additionally take pictures of tire wheels and move them to the second area (502) (step 606). Repeating procedures like this, user can stack multiple icons in the second area (502). Now selecting one of the stacked icons (starting touch input) (step 607) then dragging it to a desired position and taking hands off (finishing touch input), object that corresponds with the selected icon is inserted into the main image. After that user can insert multiple objects into main image by selecting other stacked icons and dragging them to the desired position (step 608).

Figure 7:
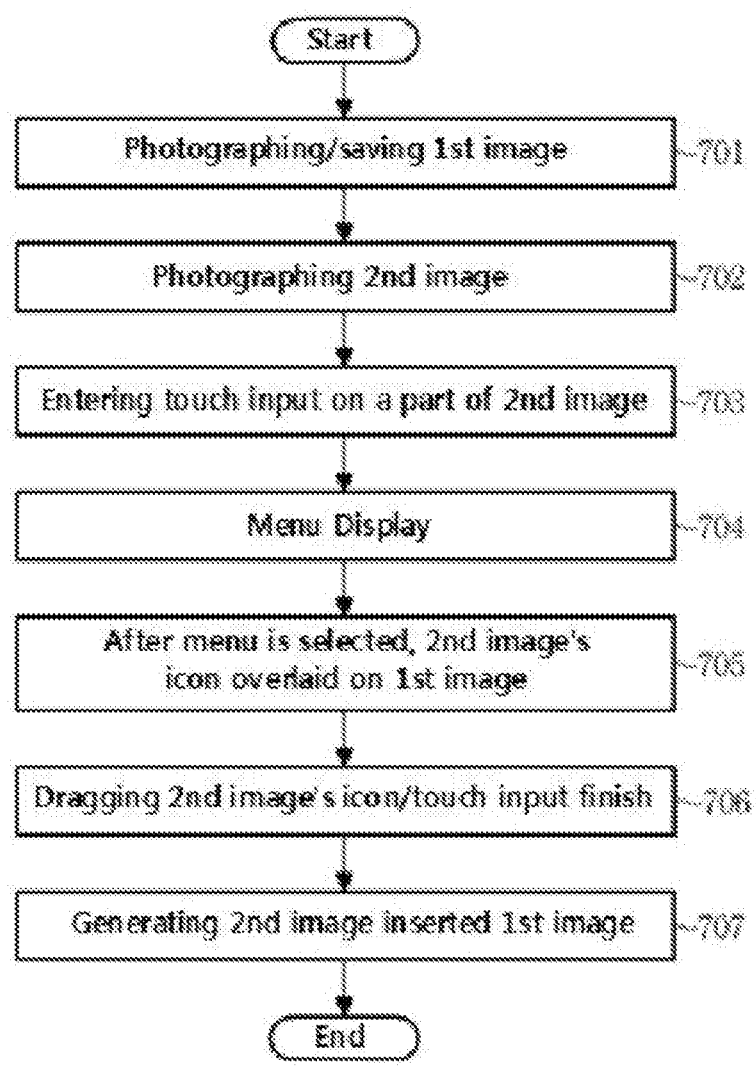
FIG. 7 represents the flowchart of generating object-inserted image by inserting object image into the main image.

FIG. 7 represents a flowchart of generating object-inserted image by inserting object image into main image. In reference to FIG. 7, at step 701, mobile devices' control area photographs the object according to shooting signal from user's input and saves this as a first image in the storage. User's input signal can be touch-base or physical key/button input. The saved first image above does not have any objects inserted into it and thus can be decided to be main image. At step 702, second image is photographed according to the user input signal. At step 703, when the mobile device receives touch input signal of a part of second image, it can display menus that are applicable to the second image at step 704. This menu may be displayed immediately after the input or after the touch input has been continued for a certain amount of time.

Second image's icon is overlaid on the first image when the menu is selected at step 705. The following describes step 705 in more detail. User keeps continuing the touch input that he/she entered at step 703. When menu is displayed user moves the touch point to the position of menu (for example, "Detail") while still keep continuing the touch input. When the touch point is moved to the position of menu (or if the touch input is kept for a certain amount of time after moving), the second image that was being displayed in first area is switched to the first image with the second image being transformed into icons and such and placed in the position of touch point.

At step 706 when the touch input is finished after second image's icon is dragged (that is, after touch point is modified), mobile device's control module inserts the second image in the place where touch input is finished on the first image. The inserted second image can be attached to the first image as an icon or as a minimized image form, or there can only be some numbers or texts that indicate an inserted image exists. Furthermore, depending on mobile devices, there may not be any indications until a particular input is received at which point an indication that object is inserted shows up.

At step 707, control module generates and stores the first image with the second image inserted into it. Control module can generate object-inserted image at the point where touch input is finished, can also generate object-inserted image after a while the touch input is finished, and can generate object-inserted image after receiving from user a separate input that indicates object-inserted image generating process completion after touch input is finished.

Figure 8:
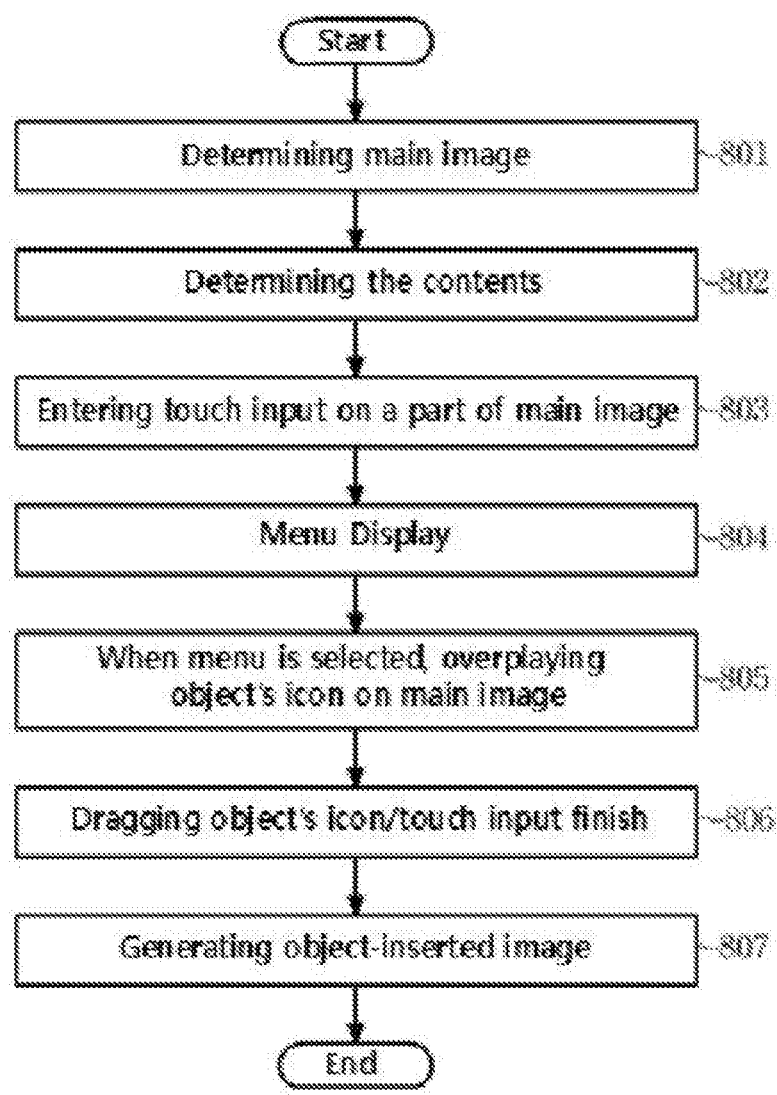
FIG. 8 represents the flowchart about generating object-inserted image after deciding the object and main image.

In FIG. 7, similar to what is explained in FIG. 1, the methods of generating object-inserted image while photographing images. But more generally, the contents that comprises object inserted images do not necessarily have to be images neither does it have to be photographed images. In FIG. 8 ways to generate object-inserted images by deciding the main image and details.

FIG. 8 illustrates a flowchart of generating object-inserted images after deciding image or details. In reference to FIG. 8, main image is determined at step 801. Control module usually decides the most recently taken or saved normal pictures, that is pictures without any details inserted, as a main image. The chosen main image will not be changed until object inserting operation is completed unless the user changes it with another image.

Figure 9:
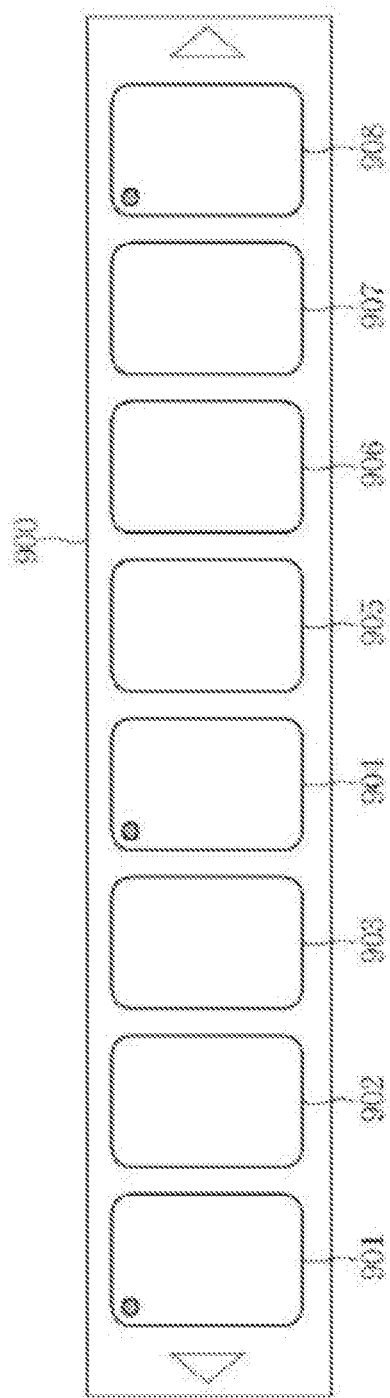
FIG. 9 represents an example of the way of determining the main image.

FIG. 9 illustrates one example of how main image is determined. FIG. 9 may represent image gallery (900) saved in the storage. Let's say that as you go to the left side, the older the images are. Images that are marked which is image 1 (901), image 4 (904), and image 8 (908) are normal images while images without the mark are the ones that are used as details which is image 2 (902), image 3 (903), image 5 (905), image 6 (906) and image 7 (907). Thus image 2 (902) and image 3 (903) recognizes image 1 (903) as main image and image 5 to 7 (905,906,907) recognizes image 4 (904) as main image. Alternatively, when images without objects inserted and images with objects inserted are mixed within image gallery, control module can pre-determine the most recently taken/saved image among normal images without objects inserted as main image.

In reference to FIG. 8, object is determined at step 802. Same as mentioned above, objects are not limited to images. Normally objects can be photographed images by filming module, a video, texts that is written in regards to main image, voice record and URL, etc. Images and videos saved in the storage can be selected as objects and according to user input, objects such as texts and voice records can be made. At step 803 when the displayed object on screen, that is image or video's preview, etc. is selected, menus about the object is displayed at step 804. At step 805, when menu is chosen, object's icon is overlaid semi-transparently on main image and at step 806, when touch input is finished after dragging object's icon to a desired position, object-inserted image is generated at step 807. Explanations that overlap with already mentioned descriptions are skipped in the above.

In reference to FIGS. 8 and 9 to examine how main image is determined again, when image 2 (902) is taken after image 1 (901) is photographed by the user, if one tries to insert image 2 (902) as an object then image 1 (901) is automatically determined as main image. When trying to insert image 3 (903) as an object after inserting image 2 (902) into image 1 (901), control module displays image 1 (901) as main image on screen (first area (501)) since image 2 (902) is an object image. Now, after image 4 (904) is taken, if nothing is done to image 4 (904) and takes image 5 (905), even if user intended to insert image 5 (905) into image 1 (901), control module recognizes image 4 (904) as main image and displays it on the screen since it is a normal image that has not been used as an object. In this case, a change of main image is required.

Also multiple main images can be displayed fixed on the bottom of second area as a form of thumbnail. When touch input is kept for a while on one of the thumbnails of main image located in the bottom of second area, the main image is automatically displayed on the whole screen of third area. The touch input of the object may have been kept at this point. For example, if touch input is moved onto main image's thumbnail on the bottom while keeping the fingers on the object, main image is displayed as a full screen and the user can insert object without taking the fingers off the screen and by moving to a desired position. Through methods like this it is possible to import a desired main image in order to insert multiple objects into random multiple main images without having to go to gallery.

In cases like this, one can change main image through stacking operation and pre-determined gestures. User can determine and search images for main image through pre-defined gestures (for example, dragging from outside the screen to inside, or pressing button that summons image gallery). At this point, control module remembers that image 4 (904) is not being used as main image and prevents image 4 (904) from being displayed as main image if image 6 (906) is photographed already. If it does not remember information about image 4 (904), when image 6 (096) is taken, then image 4 (904) will be again displayed as main image and user has to modify main image by repeating the stacking and gesture inputs. This is thus an ineffective procedure.

Figure 10:
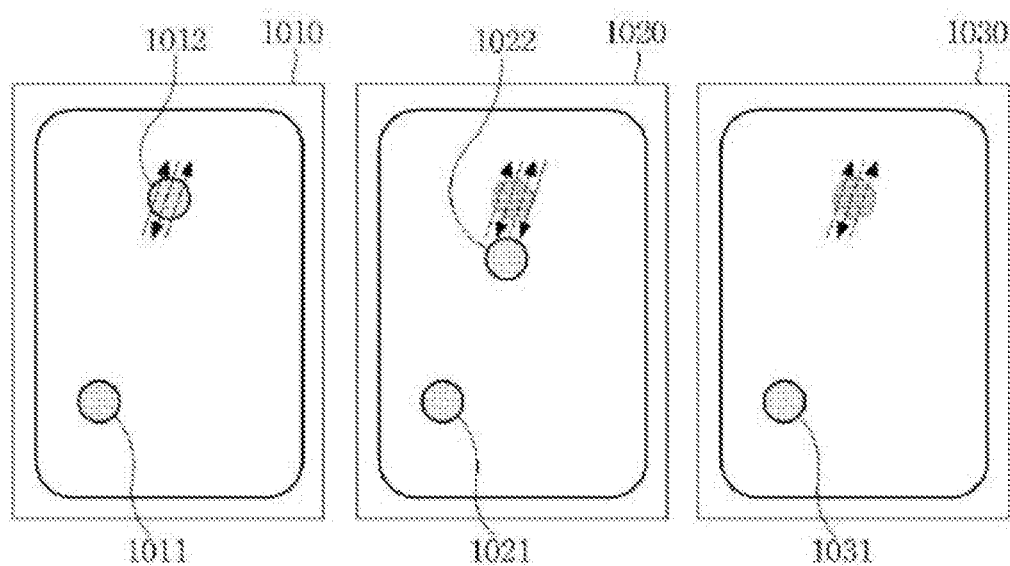
FIG. 10 represents a method of separating or deleting the object from the object-inserted image.

FIG. 10 illustrates methods of dividing or deleting objects from object-inserted images. In example 1010, detail 1 (1011) and detail 2 (1012) are inserted into the object-inserted image. When trying to separate or delete detail 2 (1012), user can separate or delete it by performing a pre-defined gestures onto the inserted objects. For example, if one provides touch input so that inserted details are passed through for a certain number of times, (1) After being passed through for a certain number of times (for example, 3 times like the solid line arrows), objects are separated from main image (1022) and thus can move along the touch point (1020). Separated objects like this can be stacked in second area (502) or can be deleted by an additional input (for example, gestures like dragging object's icon from inside to outside toward fourth area that deletes the icon when it's placed on it). For another example, (2) when touch input passes through the inserted object for more than a certain number of times, the object inserted can be deleted from main image immediately (1003). Inputs that delete objects in this way can be performed in any processes mentioned until now (Note that it is after the step that object icon is generated), and in cases of picture and videos, even if the object (icon) is deleted, the original file of the object may not be deleted.

Figure 11:
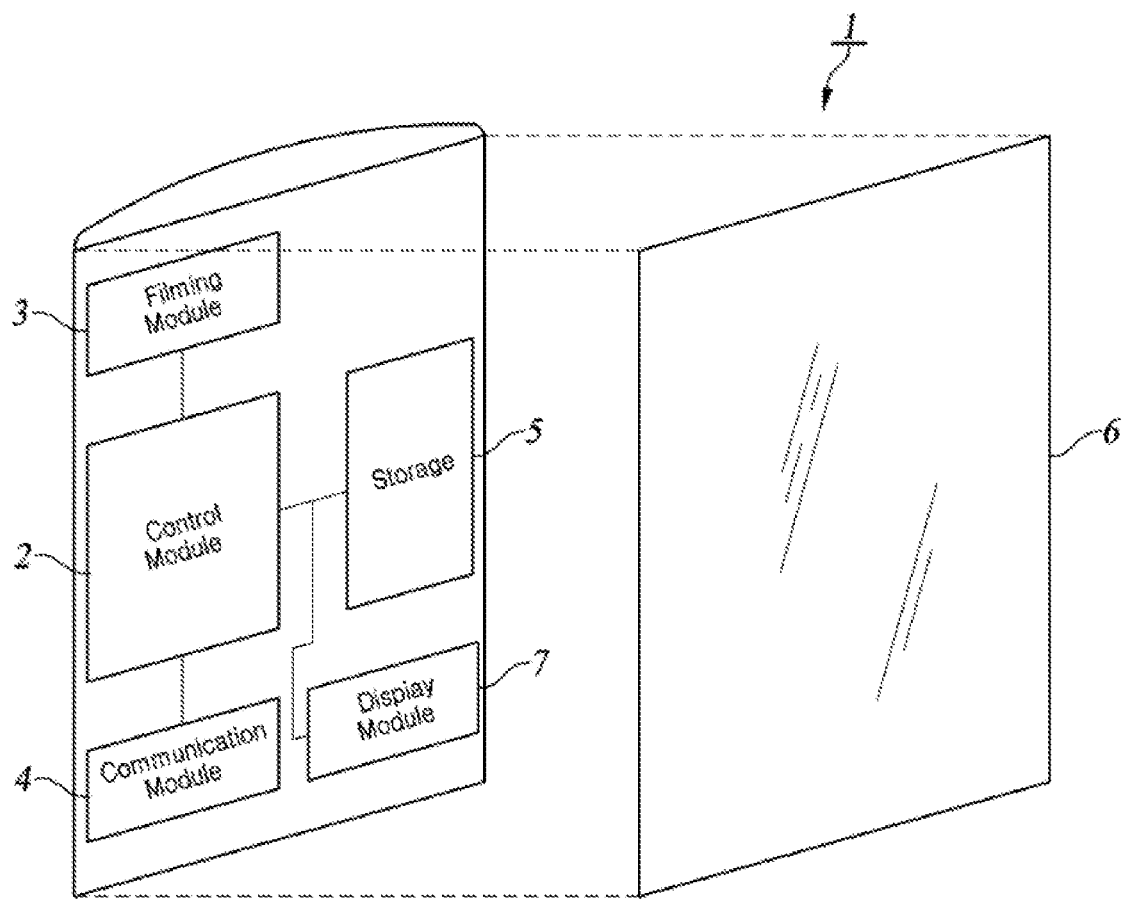
FIG. 11 represents the mobile device for realizing one practice execution of the invention.

FIG. 11 illustrates mobile device for realizing this invention's first practice execution. Mobile device (1) may include control module (2). Filming module (3), communication module (4), storage (5), screen (6), display module (7). This is an example structure and the consisting structural elements can be added or deleted depending on the business person's realization. For example, when generating/editing object inserted image with only photographed image or filmed video, communication module (4) can be deleted.

Control module (2) may be a processor such as CPU, etc. Control module (2) controls mobile device (1)'s entire operation and operates as a form of editing module when generating/editing object-inserted images. Also, control module (2) may include its own memory separate from storage (5).

Filming module (3) is generally used for operating cameras installed in mobile computing device. Filming module (3) can operate more than one camera (ex. Front and back camera). Filming module (3) can perform operations such as image tuning, adjusting brightness and saturation, panorama shooting, etc. in relation with the control module (3).

Communication module (4) takes care of data sending/receiving. Also it can receive data necessary for generating and editing object inserted images and can send the generated object inserted images to outside device or outside network. Communication module (4) can construct and keep not only line connections like LAN, Intranet but also wireless connections like Bluetooth, NFC. Moreover, it can construct and keep connection of telephone communication networks such as PSTN (public switched telephone network), 3G, 4G, LTE, and WAN (Wide Area Network).

Storage (5) saves image and objects. Storage (5) can also process temporary saving of the stacked objects in second area (502). When mobile device (1) is zero client terminal or thin client terminal based on cloud computing foundation, storage (5) can be deleted from mobile device (1)'s consisting elements (in this case data are stored in storage of cloud server).

On screen (6), image, video, text, etc. are displayed. Screen (6) can receive touch input. Touch inputs that screen (6) can receive includes electronic touch that generates electronic signals by touching the screen directly with fingers and such, resistive touch that generates pressure by directly pressing the screen with fingers, pen and such, or in case of special pens, without having to directly touch screen (6), anti-contact touch input which generates light or electronic signals that is related to the pen when it is within a certain distance to the screen and gesture inputs where the camera or muscle generates recognizable electronic signals. In this specification, touch input can be understood as all the touch inputs mentioned above.

Display module (7) receives and processes aforementioned touch inputs and performs necessary operations for contents' display. Display module (7) can be combined with control module (2) to perform the aforementioned operations.

Although not illustrated in the figures, speaker and microphone for voice recording and printing, physical buttons for a particular input, a connecting jack that enables receiving inputs through connection with keyboard/keypad, etc. can be included in mobile device (1).

Mobile device (1) like this can generate object inserted images. Specifically, control module (2) can determine main image and generate and edit object-inserted images. Display module (7) displays objects on screen (6). This object may be image or videos, etc. that are saved in storage (5) or photographed images by filming module (3) or a video preview. Control module (2) makes display module (7) to display menu about the object when user's input about displayed object is received (touch start). When user input about displayed menu is received (touch continuing), control module (2) makes display module (7) to display main image and display the iconized object on main image in overlay. When use input about moving object icon to a desired position on main image is received or finished (touch completion), control module (2) can send through communication module (4) to outside device or outside network or save in storage (5) after generating object-inserted image in the chosen position.

In regard of the aforementioned methods and devices, various deviations or additional embodiments may be possible. For one example, object-inserted image may have some depth. If the image object inserted to main image also has another image object (second image) inserted into it, main image can be defined as having the depth of 1. If the aforementioned another image object (second image) also has additional image (third image) inserted, main image is defined as having a depth of 2. For example, when a car's headlight image (image 1) is inserted to the main image showing an entire automobile, and if blueprint of headlight's lamp part (image 2) is inserted to the car's headlight image (image 1), this object-inserted image has a depth of 1. Additionally, if filament image (image 3) is inserted to blueprint (image 2)'s filament part, this object-inserted image has depth of 2. For object a main images that contains depth, numbers can represent the depth through icons or thumbnails.

Methods for inserting additional objects to object images can be realized in following ways. In the state where at least one object (image 1) is inserted to main image, user moves the object (image 2) that he/she wants to add onto the already inserted one object (image 1) and wait for a certain amount of time. Now, if the one object (image 1) inserted to main image is displayed on the screen (ex. area 1 (501)), keeping the touch input, user should move the object (image 2) that he/she wanted to add onto the desired position on the already inserted object (image 1) and finish touch input. Meanwhile, the image 2 may be inserted into the main image with an depth equal to or different from image 1. For example, when receiving a depth selection command from a user, the mobile device determines whether or not the command indicates the same depth. When the depth selection command indicates the same depth, the mobile device generates an equi-depth image with image 1 and image 2 equivalently inserted with an equal depth by inserting image 2 at the same position as image 1 in the main image. When the depth selection command indicates a deeper depth, the mobile device generates a multi-depth image with images 1 and 2 hierarchically inserted in the main image with multiple depths by inserting image 2 at a position on image 1 which was already inserted in the main image.

During the process of deciding the object's position to be inserted into, main image's enlarging or reducing can be done by gesture. For example, keeping the touch input on object (or object icon), when one drags touch input in a formation of drawing a circle rightward, main image may be magnified. Inversely, when the circle is drawn leftward, main image may be reduced. This enlargement/reduction is required since object is inserted to main image when touch input is finished on the screen (taking the fingers off). But when object's icon is stacked in second area (502) and etc., since touch input is temporarily stopped, it is possible to use normal zoom features such as pinch-to-zoom or multi touch.

According to this invention's other practice execution, it can be used display as a combined form that reveals the relation between object images and main image of front, back, left, right, top, bottom of 3D structured object. FIG. 12 illustrates dimensionalizing function according to this invention's another practice execution. Dimensionalizing function enables generating a solid cluster structure by connecting in desired angles the pictures taken in various directions of a three-dimensional object.

In reference to FIG. 12, a particular object (1201-1) inserted to main image can have a structure that includes multiple surfaces. Also, main image (1202) can be a multiple surface structure if it is generated by dimensionalizing function. Depending on the structure of object, surfaces can be connected in various ways—for example, in case of interior structure, structure (1203) that have walls connected with the ceiling(or floor) as a center; in case of 3D structures that contains many layers, structure (1204) that have connected pictures photographed multiple times in same (or similar angle) depending on the needs; in case of circular space or plaza, structure (1205) that looks as if surfaces are stacked in 3D structure with detailed angle shots. On each surfaces, one can attach object image through detailing feature.

Object-inserted image or detailed picture's viewing can be done by manual mode or automatic mode. While both modes supports the form where object is inserted to main image as an icon, slide form, relationship diagram form, or display mode that surrounds main image like tiles can also be supported. For notes, manual mode represents a mode where one selects each objects on the object-inserted picture to view original copy of objects and automatic mode represents a mode where objects are automatically viewed according to the inserted order. Automatic mode provides slide show viewing while manual mode doesn't.

This invention can be utilized in mobile messengers such as Kakao Talk, line and SNS such as Facebook, twitter. Also it can be used in internet shopping mall for generating product info pictures and also can be used as real time report solution of branch inspections or construction companies that require photograph information. Furthermore, it can be used for creating a presentation's picture materials or for simply arranging one's personal pictures. Also it can be used in various fields such as science inspection's filed data collecting or as a production tool for creating homepage/blogs.

Business person may understand the block diagrams in this invention as a form of theoretically illustrating the circuit for realizing the invention's principles. Similarly, arbitrary flow chart, flow diagram, state transition diagram, pseudocode, etc. are demonstrated realistically in computer readable medium so whether computer or processor is clearly illustrated or not, business person may recognize the as illustrating various processes that can be performed by computer or processor. Thus, aforementioned practice executions of this invention can be created by programs that can be performed in computer, and can be realized in normal digital computer that operates aforementioned program through computer readable recording medium. Recording mediums that are readable in computer includes mediums such as magnetic storing medium (ex. Rom, floppy disk, hard disk etc.) and optical reader (ex. CD rom, DVD, etc.)

Illustrated functions of various elements can be provided through the usage of not only hardware that can operate appropriate software but also through the usage of private hardware. When it is provided by a processor, functions like this can be provided by single private processor, single public processor, or multiple individual processors that a allows a part of it to be shared. Also, the terms "processor" or "control part"'s usage should not be understood as exclusively indicating hardware that can operate software, and may include DSP hardware, read only ROM for saving software, RAM, and non-volatile storage.

In this specification's request clauses, elements illustrated as a means of performing a particular function includes arbitrary method that performs a particular function and these elements may include an association of circuit elements that perform a particular function, or arbitrary form of software that includes firmware, micro code, etc. that are combined with appropriate circuit in order to perform software for performing the particular function.

In this specification, terms such as 'one practice execution' and diverse variations of these names mean to be included in at least one of the practice executions of this invention's principles in regards of this practice execution, certain feature, structure, property, etc. Thus, terms such as 'one practice execution' and other such arbitrary variations throughout this specification does not necessarily indicate the same practice execution.

In this specification, the term 'between¯, at least one' in the case of 'between A and B, at least one', is used to include the first option which is (A), the second option which is (B), and third option which is both (A) and (B). For additional example, in the case of 'at least one in A, B, and C', it includes first option which is only (A), second option which is only (B), third option which is only (C), fourth option which is both (A and B), fifth option which is (B and C), sixth option which is (A and C) and the last option which is all (A, B and C). Even if more options are enumerated, it is clear to be possibly expanded in its interpretation.

Up until now, we have examined this invention, mainly focusing on appropriate practice executions. All practice executions and conditional examples illustrated in this specification are written by the person skilled in the relevant field of technology for the purpose of helping reader's understanding about this invention's principles and theories, and thus business person may understand that this invention can be realized in modified forms within the boundary the invention's essential characteristics. Therefore, illustrated practice executions should be considered in explanative perspective, not in a limiting perspective. This invention's range or boundary is indicated in patent request range, not in the aforementioned descriptions and all differences within the same boundary should be understood as included in this invention.

What is claimed is:

1. A method performed by an electronic device for inserting one or more images into a main image to generate an object-inserted image, the method comprising:
   displaying the main image on a screen of the electronic device;
   determining a first position for inserting a second image, which is separate from the main image, into the main image in response to a user input;
   identifying whether a first image, which is separate from the main image and the second image, has been already additionally inserted at the first position in the main image in a substantially visually hidden state;
   in response to identifying that no image has been additionally inserted at the first position in the main image, inserting the second image at the first position in the main image with original contents in the main image be maintained, wherein the insertion of the second image at the first position in the main image causes the second image to be substantially visually hidden in the main image without a user intervention; and
   in response to identifying that the first image has been already additionally inserted at the first position in the main image, displaying the first image which has been substantially visually hidden in the main image on the screen of the electronic device and inserting the second image at a second position in the first image which a user selects, with original contents in the first image be maintained, wherein the insertion of the second image at the second position in the first image causes the second image to be substantially visually hidden in the first image without the user intervention,
   wherein, in a state that the first image and the second image are inserted, the first image and the second image are substantially visually hidden in the main image when the main image is displayed on the screen of the electronic device.

2. The method of claim 1, wherein the inserting of the second image at the second position in the first image comprises:
   determining the second position in the first image in response to a user's input; and
   generating the object-inserted image with a plurality of images hierarchically inserted into the main image in a multi-depth structure, by inserting the second image at the second position in the first image.

3. The method of claim 1, wherein the first image is displayed on the screen of the electronic device in response to a user's touch input maintained for a certain period of time to the first position in the main image.

4. The method of claim 1, further comprising:
   selecting the second image to be inserted at the first position or the second position,
   wherein the second image is an image that one or more other images have been already inserted thereinto with one or more depths.

5. The method of claim 1, further comprising:
   displaying a plurality of candidate images in a partial area of the screen of the electronic device; and
   selecting, from the plurality of candidate images displayed in the partial area, the second image to be inserted at the first position or the second position according to a user's selection.

6. The method of claim 1, further comprising:
   in response to at least a predetermined number of drag inputs across an area of the main image, in which the first image is inserted, separating the first image inserted in the area from the main image.

7. The method of claim 1, wherein the inserting of the second image in response to identifying that the first image has been already additionally inserted at the first position in the main image, further comprising:
   receiving a depth selection command from the user;
   when the depth selection command indicates a same depth, generating the object-inserted image with the first image and the second image equivalently inserted into the main image with an equal depth, by inserting the second image at the first position in the main image; and when the depth selection command indicates a deeper depth, generating the object-inserted image with the first image and the second image hierarchically inserted in the main image with multiple depths, by displaying the first image and inserting the second image at the second position in the first image which is inserted at the first position in the main image.

8. A non-transitory computer readable medium storing a computer program including computer-executable instructions for causing, when executed in a processor, the processor to perform the method of claim 1.

9. The method of claim 1, wherein a hidden image is displayed on the screen, in response to an input for selecting a position where the hidden image has been inserted.

* * * * *